United States Patent [19]

Kálmán

[11] Patent Number: 5,035,346

[45] Date of Patent: Jul. 30, 1991

[54] UNITED LIQUID-LEVEL AND PRESSURE REGULATOR FOR SEPARATORS

[75] Inventor: Pintér Kálmán, Budapest, Hungary

[73] Assignee: Vegyimüveket Épitö és Szerelö Vállalat, Budapest, Hungary

[21] Appl. No.: 300,344

[22] Filed: Jan. 23, 1989

[30] Foreign Application Priority Data

Mar. 10, 1988 [HU] Hungary .............................. 1146/88

[51] Int. Cl.⁵ .............................................. B67D 5/08
[52] U.S. Cl. ..................................... 222/68; 222/481;
222/482; 222/485; 137/411; 55/219
[58] Field of Search ...................... 222/68, 67, 69, 478,
222/481, 482, 484, 485, ; 210/119, 120, 121,
123; 137/391, 411, 423; 261/70, 2, 43, 119.1,
120; 55/421, 215, 216, 218, 219; 73/200; 159/31

[56] References Cited

U.S. PATENT DOCUMENTS 2,177,330 10/1939 Pressler .............................. 222/68 X
3,158,193 11/1964 Anderson ........................ 222/68 X Primary Examiner—David H. Bollinger
Attorney, Agent, or Firm—Schweitzer Cornman & Gross

[57] ABSTRACT

The invention relates a combined liquid level and pressure regulator for separators, comprising a liquid level sensing float connected through a rigid vertical shaft with two discharge cross section controlling valves. The essence of the invention is that the discharge cross section controlling valves are pressure-compensated slide valves arranged so as to control the discharge cross sections of the gas outlet and the liquid outlet of the separator.

5 Claims, 3 Drawing Sheets

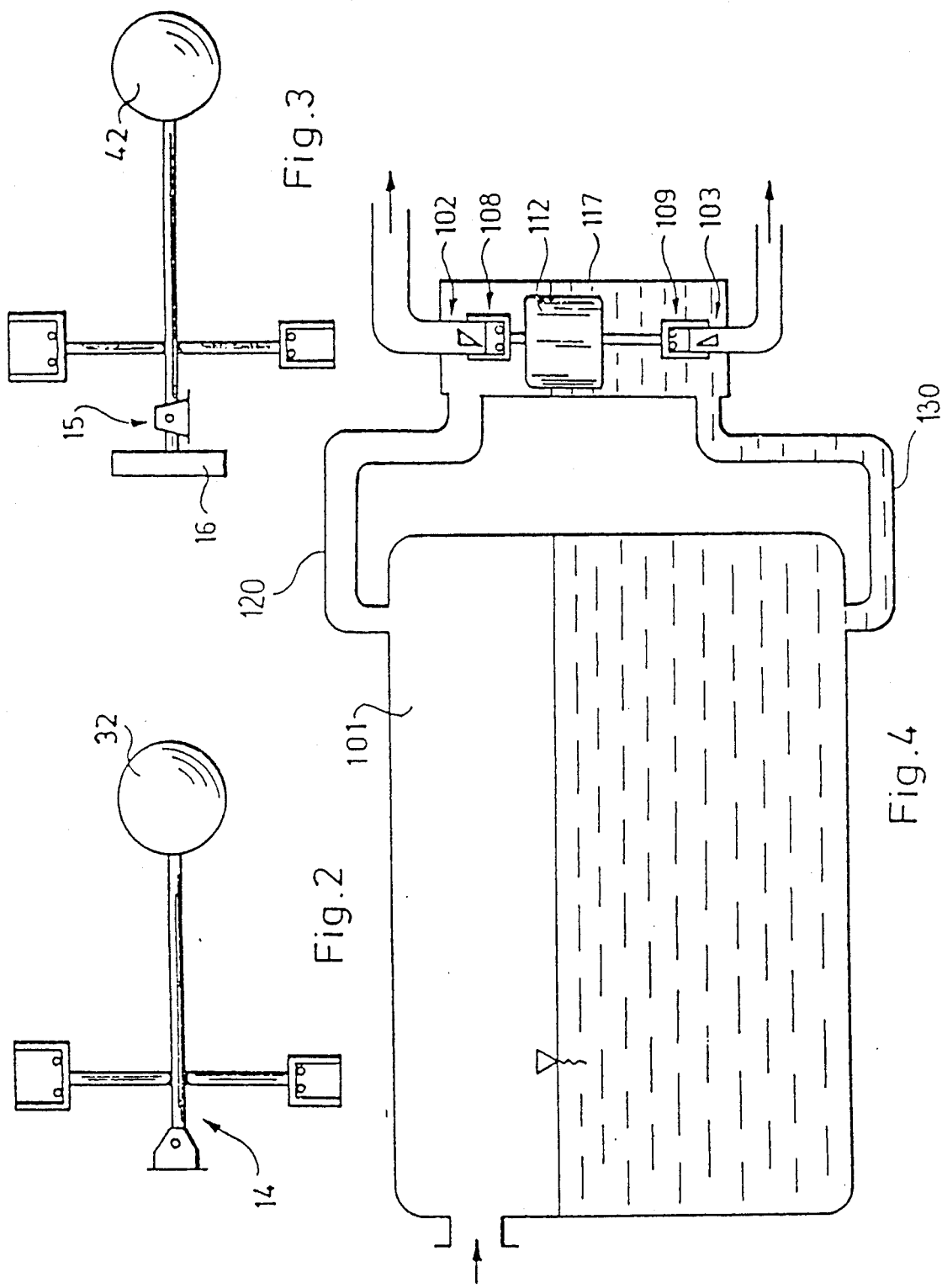

UNITED LIQUID-LEVEL AND PRESSURE REGULATOR FOR SEPARATORS

FIELD OF THE INVENTION

The invention relates to a combined liquid level regulator and pressure regulator for separators which can be used particularly in the oil and chemical industries for separators for mixtures of different phases.

BACKGROUND OF THE INVENTION

In the oil industry, chemical industry and other fields of industry phase separation is widely used. Generally, liquid and gaseous components of a mixture are separated in separators operating with overpressure. Known separators are arranged partly in vertical or in horizontal position. In continuous operation of separators the separated phases should be led away continuously, suitably by maintaining liquid level and pressure at constant levels. For that purpose regulators are installed into the outlets of the liquid and gaseous phases. Regulating sensors can be moved by direct mechanical arrangement, or by an interior converter utilizing auxiliary energy.

Generally the two tasks, namely the regulation of pressure, and the control of liquid level are carried out by two independent units.

In mechanical pressure regulation a valve, usually a butterfly valve, is arranged in the gas outlet, moved suitably by a float sensing the liquid level. The application of such constructions is rather restricted due to the required considerable moving forces. Due to these considerable forces, neither catches, nor slide valves are used for direct regulation of liquid levels.

A solution is also known, in which regulation is performed by a balanced rotating slide valve installed into the liquid outlet of the separator. A properly dimensioned float can turn the slide valve.

Mechanical liquid level and pressure regulators are disclosed in the book "Sbor, Transport I Podgotovka Nefti" (Nedra Edition, Moscow, U.S.S.R., 1975). FIG. 48, page 122 shows a mechanism comprising a float connected through rigid shafts to two butterfly valves in the liquid and gas outlet conduits each for controlling the liquid level of the separator.

A drawback of this solution is that the forces needed for moving the butterfly valves are considerably high and that the value of the forces depends on the angle position of the butterfly valves and on the value of the measured yield. The float must be dimensioned to accommodate the maximum torque. The required torque is increased by friction forces on the block casings of the outlet subs of the butterfly valves and on the shafts of the moving mechanism. The above solution can be used only infrequently due to those drawbacks.

FIG. 35, page 96-97, of the same book shows a similar mechanism which is often employed. That mechanism includes a butterfly valve in the gas delivering outlet. The drawback of this structure is that the discharge of the separator cannot be eliminated.

No mechanical construction is known which provides a simultaneous regulating of liquid level and of pressure of separators, without utilizing external power input.

The fundamental drawbacks of the known mechanical regulating systems are that the restricted actuating force produced by them is generally not suitable for the actuation of the control organs, and also synchronization of the level and the pressure regulation have not been accomplished as yet.

Regulators actuated by auxiliary energy have been applied to eliminate these drawbacks, but a disadvantage of this is that they also require auxiliary power.

DESCRIPTION OF THE INVENTION

The object of the invention is to develop a self controlling system of simple structural design which is able to perform simultaneously the tasks of liquid level and pressure regulation of a phase separator and insures optimal pressure drop, and constant supervision is not needed. Another object is to realize a system which operates without auxiliary power input.

To meet these objects we developed a combined liquid level and pressure regulator comprising a float for sensing the liquid level, and two discharge cross section regulators connected to the float through a vertical shaft, with the added improvement that the discharge cross section regulator is a pressure compensated slide valve in each of the gas outlet and the liquid outlet of the separator for regulating the discharge cross section of the gas outlet and the discharge cross section of the liquid outlet, depending on the position of the float.

The pressure compensated slide valve controlling the discharge cross section of the gas outlet is connected to the end of the upper half of the vertical shaft, while the pressure-compensated slide valve controlling the discharge cross section of the liquid outlet is connected to the end of the lower half of the vertical shaft.

The float can be arranged in the inside of the separator or on its exterior, in a separate vertical armature.

The separator according to the invention, if required, can be completed with a mass-balancing and/or force-increasing slide valves.

The pressure-compensated slide valves (i) have a cylindrical casing with at least one open end surface and a cylindrical element axially slidably embedded in the cylindrical casing;

(ii) said cylindrical element has a closed end surface which ranges into the cylindrical casing through said open end surface of the cylindrical casing, (iii) said cylindrical casing is connected to the vertical shaft, (iv) on or near to the opposite end surface of said cylindrical casing there is provided at least one opening thorough which the gas and the liquid can enter the internal space of the cylindrical casing, (v) in the cylindrical wall of said cylindrical element, at the height of the open end surface of said cylindrical casing there is provided at least one slot through which the gas and the liquid can enter the internal space of the cylindrical element, and (vi) said cylindrical element is connected as end stub to the gas outlet, or the liquid outlet of the separator. dr

DESCRIPTION OF THE INVENTION

The invention is described in more detail with reference to the accompanying drawings, wherein:

FIGS. 2 and 3 show schematically the details of a different embodiments of the structure according to the invention;

FIG. 4 is a longitudinally schematic partly sectional view of another embodiment of the apparatus according to the invention.

DETAILED DESCRIPTION OF PREFERRED EMBODIMENT

Figure 1:
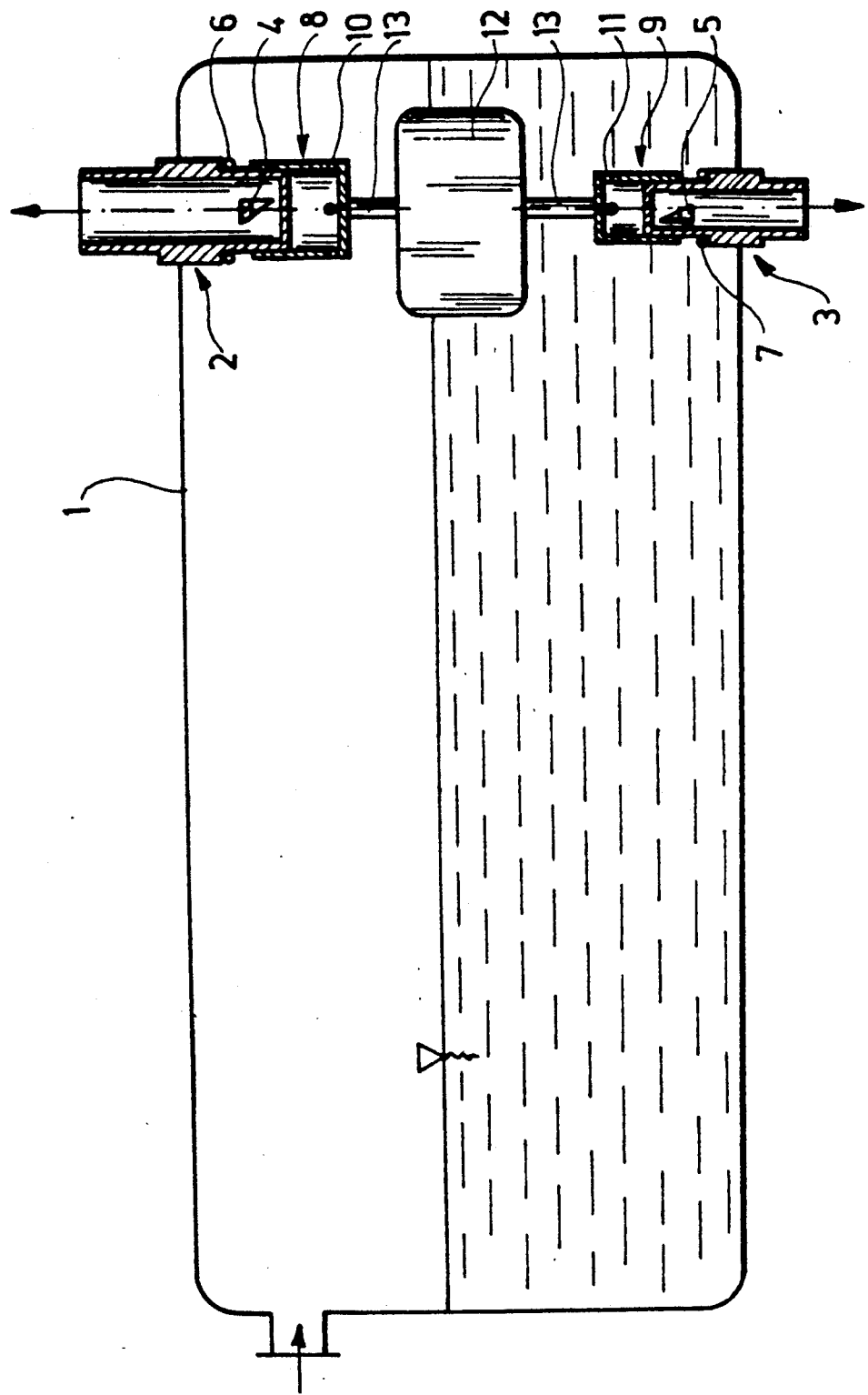
FIG. 1 is a schematic longitudinal partially sectional view of a combined liquid level and pressure regulator according to the invention.

As it is shown in the drawing the regulator according to the present invention is connected to a separator 1. The regulator comprises a float 12 and two pressure-compensated slide valves 8 and 9 which are in cooperating forced connection with the float 12 through a vertical shaft 13. The upper slide valve 8 is connected to a gas outlet 2, and the lower slide valve 9 is connected to a liquid outlet 3 of the separator 1.

Figure 5:
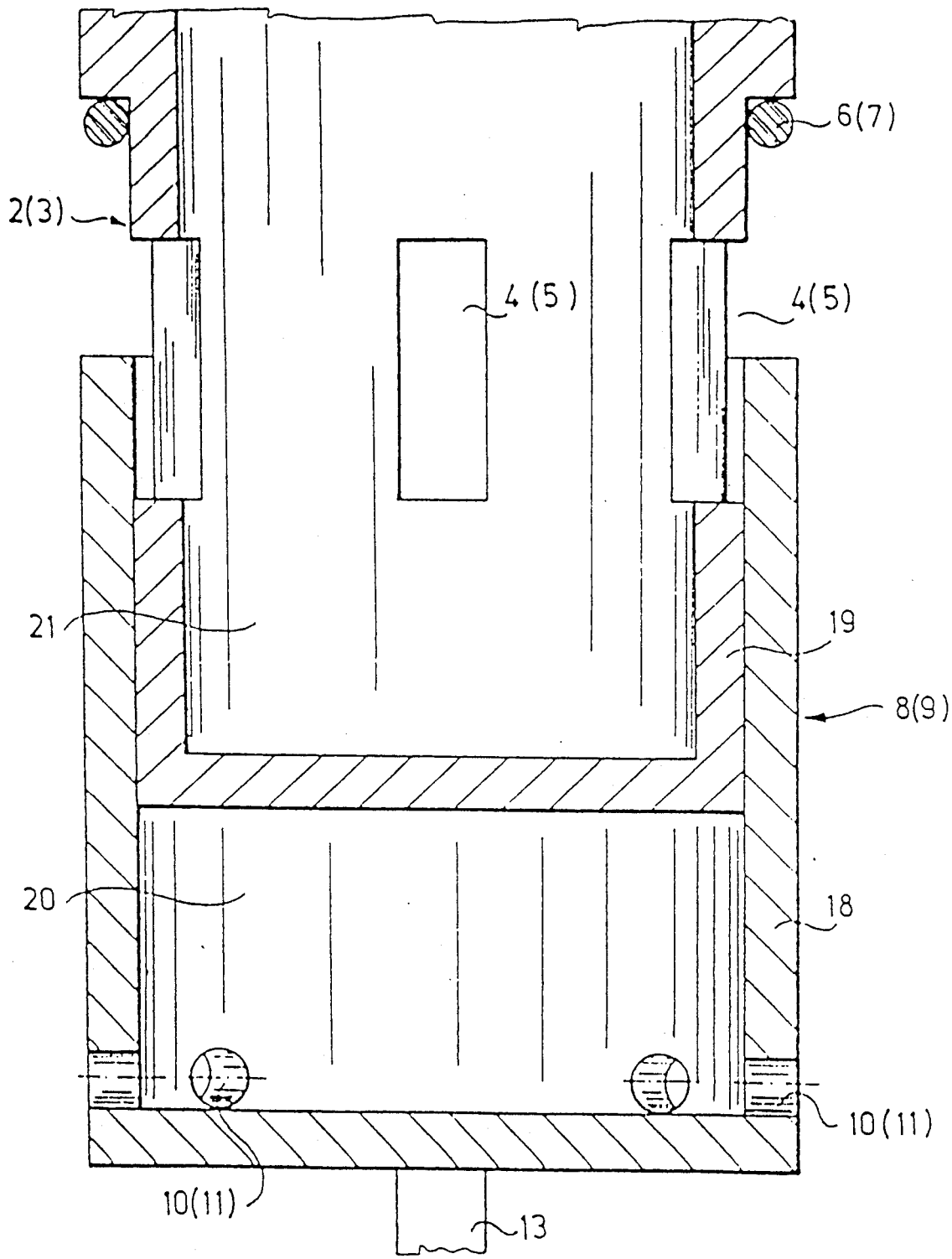
FIG. 5 is a cross sectional view of a pressure compensated side valve.

The pressure compensated slide valves 8 and 9 have some structure as shown in FIG. 5. The pressure-compensated slide valve 8 has a cylindrical casing 18 with at least one open end and a cylindrical element 19 with one closed and one open end. The cylindrical element 19 is axially slidably mounted in the cylindrical casing 18, so that the closed lower of the cylindrical element 19 ranges into the cylindrical casing 18 through its upper open end surface. Four axial slots 4 are formed in the cylindrical wall of the cylindrical element 19, at the level of the open end of the cylindrical casing 18. Openings 10 are provided in the cylindrical wall of the cylindrical casing 18, near to its closed end. In the slide valve 8 the gases enters through the openings 10 into the internal space 20 of the cylindrical casing 18. Through the slots 4 if they are not closed, the gas can enter the internal space 21 of the cylindrical element 19. The cylindrical casing 18 is connected to the vertical shaft 13.

The cylindrical element 19 is formed as a closed end stub of the gas outlet 2, so the internal space 21 is in direct connection with the pipe carrying the separated gaseous, component.

A controlling range of the discharge cross sections of the gas can be achieved according to the requirements by the number and dimensioning of the slots 4 in the slide valve 8. As the gas enters the internal space 20 through the openings 10 and the internal space 21 through the slots 4, the pressures in the spaces 20 and 21 are equal. Due to this fact there are no forces needed to move the cylindrical casing 18 relative to the cylindrical element 19 but the friction forces between the contact surfaces, so the float 12 can easily move the cylindrical casing 18 through the vertical shaft 13.

The structure and operation of the slide valve 9 for the liquid is the same as the structure of the slide valve 8 for the gas. In FIG. 5, the reference numerals contained in parentheses relate to corresponding parts of the liquid valve 9.

When the liquid yield increases, the float 12 rises and lifts the slide valves 8 and 9, whereupon the slide valve 9 for liquid increases the discharge cross section of its gaps 5, while the slide valve 8 for gas reduces the discharge cross section of its gaps 4. The discharge cross section of the gas outlet 2 is thus reduced simultaneously with the increase of the discharge cross section of the liquid outlet 3. The pressure in the system rises and promotes flow of the increased liquid yield.

The stubs of the gas outlet 2 and of the liquid outlet 3 are provided with seals 6 and 7, respectively, to prevent overflow.

FIG. 2 illustrates the scheme of another embodiment of the invention which includes a force increasing mechanism comprising a single-armed lever 14 connected with a float 32.

FIG. 3 schematically illustrates another embodiment having a force-increasing and mass-balancing mechanism in the form of a double-armed lever 15 balanced by a balance mass 16, and connected to a float 42.

With the embodiment according to FIG. 1 the combined liquid level and pressure regulator is mounted directly in the separator 1. With the embodiment shown in FIG. 4, a vertical armature 117 contains the combined liquid level and pressure regulator according to the invention. The upper inlet of the armature 117 is connected with the gas outlet 120, while the lower inlet of the armature 117 is connected with the liquid outlet 130 of the separator 110. In all other respect to the design of the embodiment of FIG. 4 corresponds to that of FIG. 1, with parts 102, 103, 108, 109 and 112 of FIG. 4 corresponding to elements 2, 3, 8, 9 and 12, respectively of FIG. 1.

It is evident from the foregoing disclosure that the regulator according to the invention has a simple construction, simultaneously performs both functions of liquid level and pressure regulations and does not need any external auxiliary power. A further advantage is that constant supervision is not required due to self regulation.

I claim:

1. A combined liquid-level and pressure regulator for separators, comprising a liquid level sensing float connected through a rigid vertical shaft with two discharge cross-section controlling means, characterized in that said two discharge cross-section controlling means are pressure-compensated slide valves arranged so as to control respectively the discharge cross-sections of a gas outlet and a liquid outlet of the separator.

2. A combined liquid-level and pressure regulator for separators according to claim 1, further characterized in that
   (a) said pressure-compensated slide valves each has a cylindrical casing with an open end and a closed end and a cylindrical element axially slidably received in the cylindrical casing;
   (b) said cylindrical element has a closed end which extends into the cylindrical casing through the open end thereof;
   (c) said cylindrical casing being connected to said vertical shaft;
   (d) on or near to the closed end of said cylindrical casing there is provided at least one opening through which the fluid can enter an internal space of the cylindrical casing;
   (e) in a cylindrical wall of said cylindrical element there is provided at least one slot through which the fluid can controllably flow into the internal space of the cylindrical element; and
   (f) said cylindrical element being connected as an end member to the gas outlet and liquid outlet respectively of the separator.

3. A combined liquid-level and pressure regulator for separators as claimed in claim 2 characterized in that said float is arranged directly in the separator.

4. A combined liquid-level and pressure regulator for separators as claimed in claim 2 characterized in that said float is arranged outside the separator in a separate vertical armature.

5. A combined liquid-level and pressure regulator for separators as claimed in claim 2 characterized in that said float is provided with a mass-balancing and/or force-increasing mechanism.

* * * * *